July 13, 1954   J. E. MARTENS   2,683,280
HINGE
Filed March 22, 1951   2 Sheets-Sheet 1
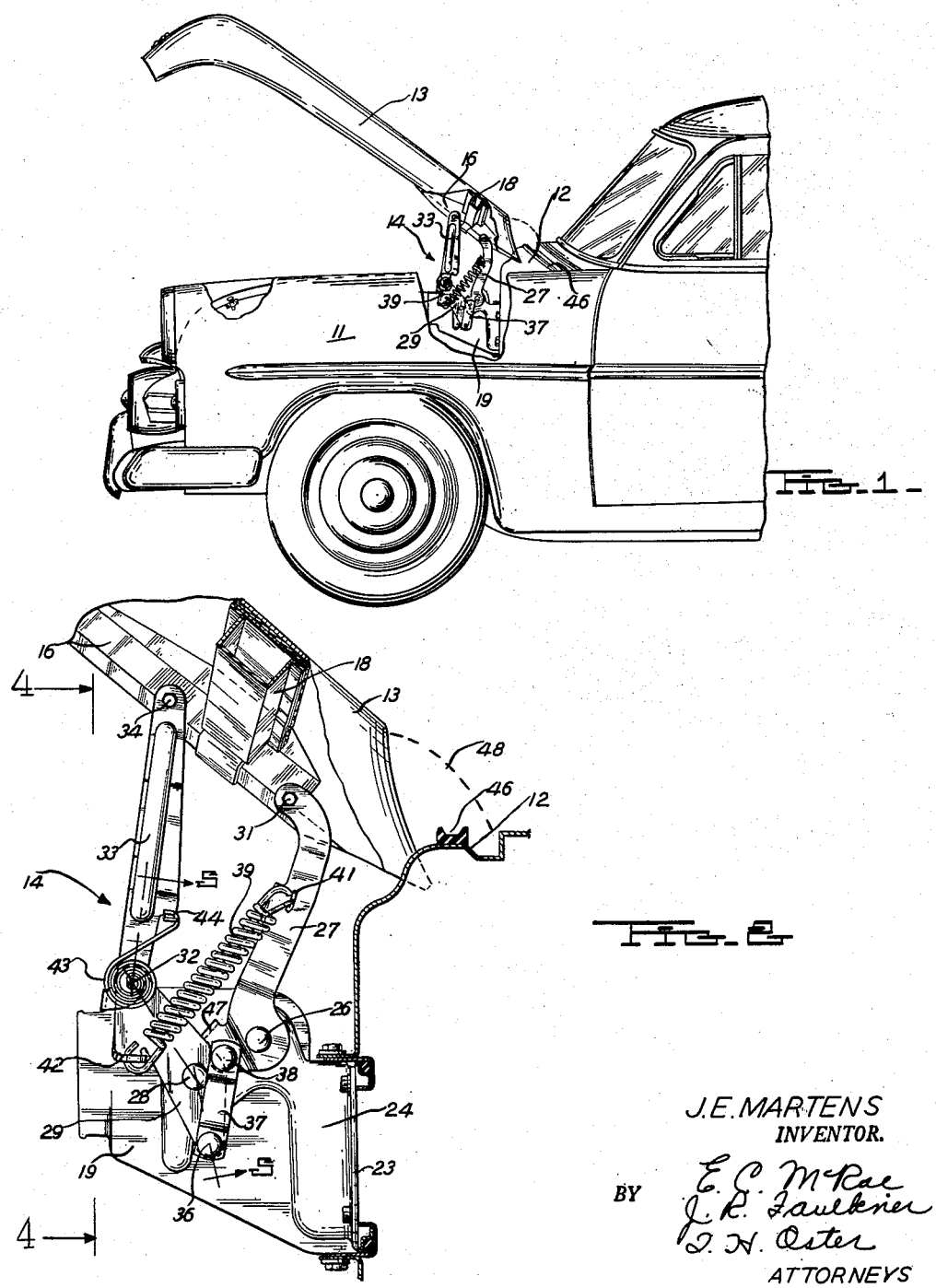
J.E. MARTENS
INVENTOR.
BY
*E. E. McRae*
*J. R. Faulkner*
*D. H. Oster*
ATTORNEYS July 13, 1954     J. E. MARTENS     2,683,280
HINGE
Filed March 22, 1951     2 Sheets-Sheet 2
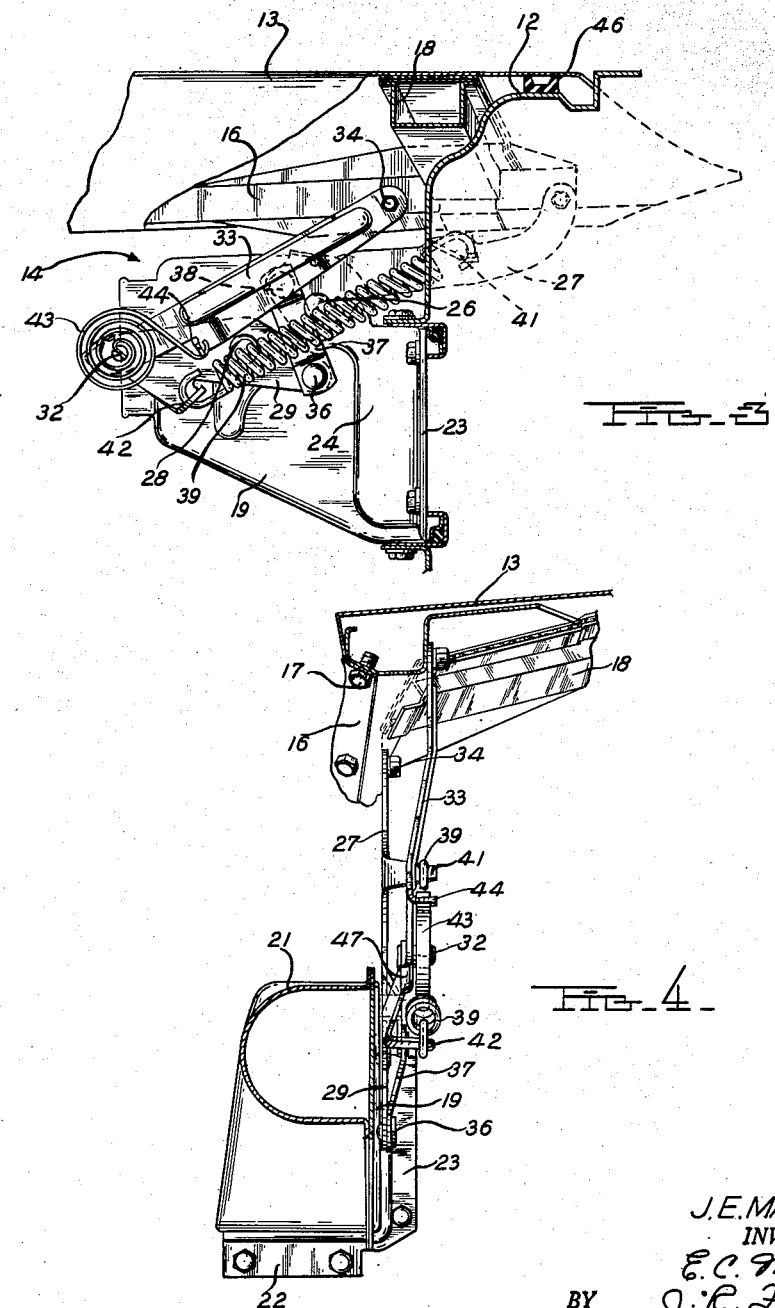
J. E. MARTENS
INVENTOR.
BY E. C. McRae
J. R. Faulkner
J. H. Oster
ATTORNEYS Patented July 13, 1954

2,683,280

UNITED STATES PATENT OFFICE 2,683,280

HINGE

Jack E. Martens, Detroit, Mich., assignor to Ford Motor Company, Dearborn, Mich., a corporation of Delaware Application March 22, 1951, Serial No. 217,037

1 Claim. (Cl. 16—163)

This invention relates generally to hinges for automotive vehicles.

The hinge forming the subject matter of this invention is designed particularly for use in connection with the "alligator" type hoods closing the engine compartments of present day motor vehicles.

An object of the present invention is to provide a hinge of this type which is concealed from view in the closed position of the hood and which is relatively simple and lightweight in construction so as to lend itself to economical manufacture.

Another object of the invention is to provide a hinge having spring means arranged to hold the hood down against the adjacent body panel in the closed position of the hood so as to prevent rattling and vibration. The hinge also incorporates spring means so arranged as to assist in raising the hood and in holding the hood in its open position.

Briefly, the hinge comprises front and rear links pivotally connected to the underside of the hood at longitudinally spaced points, the rear link being also pivotally connected to a mounting bracket carried by the vehicle body and the front link being pivotally connected to a pivot link which is pivotally connected intermediate its ends to the mounting bracket. The free end of this pivot link is connected to the rear link by a short control link. The arrangement is such that the initial opening movement of the hood results in raising the rear edge of the hood upwardly from its closed position and thereafter operates to swing the hood to an open position providing access to the engine compartment.

Other objects and advantages of the invention will be made more apparent as this description proceeds, particularly when considered in connection with the accompanying drawings, wherein:

Figure 1 is a side elevational view of the forward portion of a motor vehicle, showing the hood in its open position, and with a portion of the hood and the side panel of the vehicle broken away to show in elevation the hinge assembly at the right side of the vehicle.

Figure 2 is an enlarged side elevational view of the hinge assembly shown in Figure 1.

Figure 3 is a view similar to Figure 2 but showing the hood in its closed position.

Figure 4 is a vertical cross-sectional view taken substantially on the line 4—4 of Figure 2.

Referring now to the drawings, and particularly to Figure 1, the reference character 11 indicates the side body panel of a motor vehicle having a cowl 12 and an alligator type hood 13 adapted to cover the engine compartment. The hood 13 is adapted to be opened from its forward edge and is hinged adjacent its rearward edge by means of a pair of hinge assemblies 14, one located adjacent each side of the hood.

A longitudinally extending reinforcing bracket 16 is positioned along each side of the rearward portion of the hood on the underside thereof, being secured thereto by bolts 17. The two reinforcing brackets 16 are interconnected by means of a transversely extending reinforcing member 18 in the form of a channel. The reinforcing brackets 16 and 18 are conventionally used to provide additional strength and stiffness adjacent the rearward portion of the hood.

Inasmuch as the two hinge assemblies are identical in construction, only one will be described in detail.

Each hinge assembly 14 is pre-assembled and installed as a unit, being mounted upon a mounting bracket 19 which in turn is suitably secured to the open side of the hollow duct 21, as best shown in Figure 4. The duct 21 forms part of the air intake for the vehicle heater and has a flange 22 bolted to the cowl 12. Thus it will be seen that the hinge mounting bracket 19 forms part of the heater air duct. The mounting bracket 19 is not only secured to the duct 21 but has a flange 23 at its rearward end bolted to the cowl 12 of the vehicle body.

The mounting bracket 19 is provided with an embossed portion 24. Pivotally mounted upon this embossed portion by a pivot pin 26 is the rear link 27, the upper end of which is pivotally connected by a pin 31 to the hood reinforcing bracket 16. Also pivotally mounted upon the embossed portion 24 by means of a pivot pin 28 is the pivot link 29.

The forward end of the pivot link 29 is pivotally connected by means of a pin 32 to the front link 33, the upper end of which is pivotally connected by means of a pin 34 to the hood reinforcing bracket 16. The opposite or rearward end of the pivot link 29 is pivotally connected by means of a pin 36 to a control link 37 which in turn is pivotally connected by a pin 38 to the rear link 27.

A tension coil spring 39 has its opposite ends hooked respectively over a flange 41 bent outwardly from the rear link 27 and a flange 42 bent outwardly from the pivot link 29. In addition, a flat helical spring 43 of the clock type is carried by the pivot pin 32 interconnecting the front link 33 and the pivot link 29 and has its free outer end hooked over flange 44 bent outwardly from the front link 33. The pivot pin 32 supporting the inner end of the clock spring is fixedly carried by the pivot link 29.

It will be noted from an examination of Figure 3, which shows the hinge assembly in the position it occupies when the hood is closed, that the tension spring 39 extends beneath the pivot pin 26 forming the pivotal axis for the rear link 27. The spring consequently exerts a closing force upon the rear link 27. In addition, the tension spring 39 passes beneath the pivot pin 28 forming a pivotal axis for the pivot link 29 and the spring thus also exerts a closing force upon the front link 33 which is pivotally connected to the forward end of the pivot link 29. As a result of this arrangement, the rearward portion of the hood is positively held in its closed position tightly against the weatherstrip 46 carried by the cowl 12.

As the hood is opened it will be seen that the tension spring 39 passes the pivotal axes formed by the pins 26 and 28 and thereafter exerts an opening force upon both the front and rear links 33 and 27 respectively, thus assisting in raising the hood to its open position and in holding the hood in its fully open position. The helical or clock spring 43 also assists in opening the hood and in maintaining it open. This spring exerts a constant counterbalancing force upon the front link 33 which is at a maximum when the hood is closed and somewhat smaller when the hood is open. In addition, the front link 33 and the pivot link 29 form a toggle effective to assist in maintaining the hood open.

The fully open position of the hood is determined by a flange 47 formed at the lower end of the rear link 27 and arranged to engage the pivot link 29, as best seen in Figure 2.

The reference character 48 in Figure 2 indicates the path of travel of the rearward edge of the hood at the longitudinal center line of the vehicle as the hood is moved between its closed and open positions. It will be noted that the initial opening movement is in a generally upward direction so that the hood is lifted clear of the weather strip 46 during the first part of its movement. Subsequently, the hood is swung upwardly by reason of the transmission of movement from the rear link 27 to the pivotal link 29 through the control link 37 and the consequent raising of the front link 33.

It will be understood that the invention is not to be limited to the exact construction shown and described, but that various changes and modifications may be made without departing from the spirit and scope of the invention, as defined in the appended claim.

What is claimed is:

A hinge for hingedly connecting a motor vehicle hood to the cowl structure of the vehicle body, comprising a mounting bracket secured to said cowl structure and extending forwardly therefrom, a bell crank lever having a short arm and a long arm and pivotally connected at the junction between said short and long arms to said mounting bracket, the long arm of said bell crank lever extending generally horizontally rearwardly in the closed position of said hood and being pivotally connected at its rearward extremity to said hood, a generally horizontally extending pivot lever pivotally connected intermediate its ends to said mounting bracket at a point located forwardly and beneath the pivotal connection of said bell crank lever to said mounting bracket, a front link having its lower end pivotally connected to and supported solely on the forward end of said pivot lever at a point spaced forwardly from the pivotal connection of said pivot lever to said mounting bracket and being inclined upwardly and rearwardly therefrom in the closed position of said hood and having its upper end pivotally connected to said hood, a short control link extending generally vertically and located between the pivotal connections of said bellcrank lever and said pivot lever to said mounting bracket, a pin fixed in said control link and pivoted to the rearward end of said pivot lever, the upper end of said control link being pivotally connected to the short arm of said bell crank lever, said control link effecting simultaneous and interrelated swinging movement of said pivot lever and said bell crank lever about their respective pivotal mountings on said mounting bracket at all times during the cycle of movement between the fully closed and fully open positions of said hood to swing said bellcrank lever about its pivotal connection to said mounting bracket and to move the lower end of said front link in an arc about the pivotal connection of said pivot lever to said mounting bracket, and a tension coil spring having its lower end connected to said pivot lever between the pivotal connections of said pivot lever to said front link and to said mounting bracket at a point spaced beneath a plane containing the axes of the pivotal connections of said pivot lever and said bell crank lever to said mounting bracket, the upper end of said tension coil spring being connected to the long arm of said bellcrank lever at a point spaced beneath said last-mentioned plane to hold said hood in its closed position.

References Cited in the file of this patent

UNITED STATES PATENTS

| Number | Name | Date |
|---|---|---|
| 586,476 | Coates | July 31, 1897 |
| 934,149 | Englerth | Sept. 14, 1909 |
| 2,173,644 | Blackmore | Sept. 19, 1939 |
| 2,185,213 | Claud-Mantle | Jan. 2, 1940 |
| 2,271,422 | Gould | Jan. 27, 1942 |
| 2,634,455 | Fish | Apr. 14, 1953 |

FOREIGN PATENTS

| Number | Country | Date |
|---|---|---|
| 62,570 | Sweden | Mar. 8, 1927 |